(12) United States Patent
Lai et al.

(10) Patent No.: US 8,735,524 B2
(45) Date of Patent: May 27, 2014

(54) SILICONE CONTAINING COMPOSITIONS AND USES THEREOF

(75) Inventors: Kuo-Tsai Griffin Lai, Allentown, PA (US); Christine Anne Suzanne Louis, Haarlem (NL); Suresh Kalpatu Rajaraman, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/411,698

(22) Filed: Mar. 5, 2012

(65) Prior Publication Data

US 2013/0065998 A1 Mar. 14, 2013

Related U.S. Application Data

(60) Provisional application No. 61/532,606, filed on Sep. 9, 2011.

(51) Int. Cl.
C08G 77/04 (2006.01)
C08G 77/12 (2006.01)
C07F 7/08 (2006.01)

(52) U.S. Cl.
USPC .......... 528/10; 528/25; 528/26; 556/445

(58) Field of Classification Search
None
See application file for complete search history.

(56) References Cited

U.S. PATENT DOCUMENTS

| 3,341,338 | A | * | 9/1967 | Pater .............................. 106/10 |
| 3,402,192 | A | | 9/1968 | Haluska |
| 3,746,653 | A | | 7/1973 | Churchfield |
| 4,711,714 | A | | 12/1987 | Callaghan et al. |
| 4,920,168 | A | * | 4/1990 | Nohr et al. ..................... 524/188 |
| 5,035,832 | A | | 7/1991 | Takamura et al. |
| 5,036,123 | A | * | 7/1991 | Ozaki et al. .................... 524/267 |
| 5,132,047 | A | * | 7/1992 | Tanaka et al. ................... 516/23 |
| 5,149,765 | A | * | 9/1992 | O'Lenick, Jr. ................. 528/25 |
| 5,210,133 | A | * | 5/1993 | O'Lenick, Jr. ................. 525/54.1 |
| 5,357,018 | A | * | 10/1994 | Burkhart et al. ................ 528/15 |
| 5,432,206 | A | * | 7/1995 | Stanga et al. .................. 521/110 |
| 5,540,984 | A | * | 7/1996 | Quincy et al. ................. 442/118 |
| 5,559,074 | A | * | 9/1996 | Watanabe et al. .............. 428/447 |
| 5,625,024 | A | | 4/1997 | Schlitte et al. |
| 5,733,971 | A | | 3/1998 | Feldmann-Krane |
| 5,985,948 | A | * | 11/1999 | Burkhart et al. .............. 521/112 |
| 6,613,815 | B2 | | 9/2003 | Lin |
| 6,630,415 | B2 | * | 10/2003 | Phillips et al. ................. 442/119 |
| 6,987,157 | B2 | * | 1/2006 | Clement et al. ................ 528/15 |
| 8,008,407 | B2 | | 8/2011 | Oberhellman et al. |
| 2002/0091193 | A1 | * | 7/2002 | Halloran et al. .............. 524/588 |
| 2007/0141250 | A1 | * | 6/2007 | Mei .............................. 427/213 |
| 2010/0184935 | A1 | * | 7/2010 | Oberhellman et al. ......... 528/15 |

FOREIGN PATENT DOCUMENTS

| EP | 398177 A2 * | 11/1990 | ............. A61K 7/075 |
| EP | 819426 A2 * | 1/1998 | ............. A61K 7/48 |
| JP | 9194782 | 7/1997 | |
| JP | 2002-322398 | 11/2002 | |
| JP | 2002322398 | 11/2002 | |

OTHER PUBLICATIONS

Yasue Uchida, Notice of Reasons for Rejection, Japanese Office Action, Nov. 19, 2013.

* cited by examiner

*Primary Examiner* — Robert S Loewe
(74) *Attorney, Agent, or Firm* — Michael K. Boyer

(57) ABSTRACT

Hydrogen, methyl, acetyl or butyl capped Polyether modified Silicone (PES) containing compositions are disclosed. The PES containing compositions can be used as defoamers or deaerators in coating compositions and, in particular, for airless sprayed compositions.

20 Claims, No Drawings

SILICONE CONTAINING COMPOSITIONS AND USES THEREOF

CROSS-REFERENCE TO RELATED APPLICATIONS

This application claims the benefit of Provisional Application No. 61/532,606, filed on Sep. 9, 2011. The disclosure of Application No. 61/532,606 is hereby incorporated by reference.

BACKGROUND OF THE INVENTION

The instant invention relates to compositions comprising polyether modified silicone having at least of a butyl or an acetyl end cap. The instant compositions can be employed in a wide range of compositions including compositions used as de-aerators for reducing, if not eliminating, air bubbles in airless and air assisted spray applied coatings.

Air bubbles and foams in coating formulations are harmful to the coating finish because the bubbles can form and leave craters, pinholes and other surface defects which are undesirable. To control bubble formation, a defoamer or deaerator, can be added to the coating in order to prevent macrofoams or microfoams, respectively.

Foams are usually generated by the additives in the coating system, such as surfactants or emulsifiers, and also by the coating application technique. For example, airless and air assisted spray applications tend to trap air into the coating as the viscosity and thickness of these coatings are usually greater than those applied by conventional spray.

Certain conventional compositions are described in U.S. Pat. Nos. 3,402,192; 3,746,653 and 4,711,714. With respect to U.S. Pat. No. 3,402,192, the primary object of this patent is to provide polyoxyalkylene siloxane copolymers which are useful as surfactants and as emulsifying agents. Another object is to provide a stable nonhydrolyzable surfactant for polyurethane foams which does not give a pneumatic effect in the foam. A further object is to provide superior surfactants for the production of polyurethane foams which exhibit excellent solubility in water and excellent stability in mixtures with polyglycols, amines and fluorocarbons. There is no disclosure of coating compositions or defoaming or deaerating coating compositions.

U.S. Pat. No. 3,746,653 relates to a composition of foam control agent particularly useful in jet dyeing of textiles. The glycol or polyoxyalkylene unit of siloxane glycol copolymer is terminated or capped by the A group. There is no disclosure of the specific nature of this group or any utility in coating compositions or defoaming or deaerating coating compositions.

U.S. Pat. No. 4,711,714 relates to water-insoluble Polyoxyalkylene graft copolymers as anti-foam agents for reducing foaming in crude oil/gas separators. There is no disclosure of coating compositions or any utility in coating compositions or defoaming or deaerating coating compositions.

The disclosure of the previously identified patents is hereby incorporated by reference.

There is a need in this art for a defoamer or deaerator for use in coating compositions.

BRIEF SUMMARY OF THE INVENTION

The instant invention can solve the foam formation problem in coating formulations and in particular airless and air assisted spray applications by providing the inventive polyether modified silicone (PES). The inventive silicones are effective deaerators to reduce, if not eliminate, microfoam in coating applications, and act as deaerators in airless or air assisted spray applications.

While any suitable PES can be employed, examples of suitable PES include hydrogen, methyl, acetyl or butyl caped PES. In certain applications, acetyl and butyl capped PES are desired and in some cases, acetyl is preferred.

One aspect of the invention comprises a composition comprising linear polyether modified silicones wherein the copolymers are of formula:

M'D$_m$M' wherein M'=[(CH$_3$)$_2$(G)SiO$_{0.5}$—]; D=[—(CH$_3$)$_2$SiO—] and G=—(CH$_2$)$_n$—O—(CH$_2$—CH$_2$—O)$_x$—(CH$_2$—CH(CH$_3$)—O)$_y$Z; wherein m=3-50, n=1-6, X=0-20, Y=2-50 and Z is hydrogen, methyl, butyl, or acetyl group.

Another aspect of the invention comprises a method for making a polyether silicone comprising contacting at least one silicone backbone with a capped polyether under hydrosilylation conditions while in the presence of at least one solvent and at least one catalyst.

A further aspect of the invention relates to a coating composition comprising at least one PES including those described above. The coating can comprise, for example, at least one of an acrylic binder, a styrene acrylate binder, a modified acrylate binder, a two-component polyurethane (2K PU) or one-component polyurethane (1K PU) binder system, a two-component epoxy binder system, and a polyester binder.

The various aspects or embodiments of the instant invention disclosed herein can be used alone or in combination with other aspects of the invention.

DETAILED DESCRIPTION OF THE INVENTION

The instant invention relates broadly to linear type polyether modified silicones wherein the copolymers are of the formula:

M'D$_m$M'

Wherein M'=[(CH$_3$)$_2$(G)SiO$_{0.5}$—]
D=[—(CH$_3$)$_2$SiO—]

G=—(CH$_2$)$_n$—O—(CH$_2$—CH$_2$—O)$_x$—(CH$_2$—CH(CH$_3$)—O)$_y$Z

Where
  m=3-50
  n=1-6
  X=0-20
  Y=2-50
Preferably
  m=5-30
  n=1-6
  X=0-10
  Y=4-30
Most preferably
  m=10-30
  D=2-4
  X=0-5
  Y=4-20

This polyether can be capped with Z which can be hydrogen, or, preferably, a methyl or butyl group, or, most preferably an acetyl group.

The inventive PES can be produced by contacting or reacting at least one silicone backbone (e.g., M$^H$D$_x$M$^H$ where X=3-50) with a capped polyether (e.g., CH$_2$=CH—CH$_2$—O—(CH2—CH2—O)$_x$—(CH2—CH(CH3)—O)$_y$Z where X any Y can range from 0-60 and Z which can be hydrogen, methyl, acetyl or butyl groups), and where $M^H$ is [—$(CH_3)_2$ $SiHO_{0.5}$]— wherein H is a hydrogen attaches to silicon atom and D is [—$(CH_3)_2SiO$—]. The backbone and capped polyether are reacted under hydrosilylation conditions while in the presence of at least one solvent and at least one catalyst. Examples of suitable solvents comprise at least one of xylene, toluene, and isopropanol and the catalyst can comprise a platinum catalyst (e.g., chloroplatinic acid) or Karstedts catalyst.

The silicone backbone can be prepared by any suitable method such as contacting the backbone with at least one acid catalyst such as acid clay, amberlyst, triflic acid, or sulphuric acid. The ratio of silicone backbone to acid catalyst can range from about 20:1 to about 1000:1. The temperature ranges from about 70° C. to about 180° C.

A polyether is capped by contacting the polyether with at least one member selected from the group consisting of acetic anhydride, sodium methylate or potassium methylate. The ratio of polyether to acetic anhydride or alkali metal methylate is about 1.0:1.0 to about 1.0:1.1. The temperature during this step ranges from about 70° C. to about 180° C.

A hydrosilylation reaction of the silicone backbone and capped polyether occurs in the presence of at least one solvent and at least one catalyst. The ratio of silicone backbone to capped polyether ranges from about 1.0:1.0 to about 1.0:1.3. Examples of suitable solvents comprise at least one of xylene, toluene, and isopropanol. Examples of suitable catalyst can comprise a platinum catalyst (e.g., chloroplatinic acid), Speier's catalyst or Karstedts catalyst. The temperature during the hydrosilylation ranges from about 70° C. to about 200° C.

In one aspect of the invention, the capped PES comprises an ABA type (or linear) type. If desired, the inventive PES is substantially free of graft type PES. By "substantially free" it is meant that the PES contains less than about 2 wt % and typically about 0 wt % of graft type PES.

One aspect of the invention relates to a PES containing composition comprising PES of this invention and, optionally, one or more other defoamers or deaerators. While any suitable other defoamer or deaerator compound can be employed, examples of suitable compounds include any defoamers other than the PES of this invention, such as mineral oil based, organic polymer based, molecular based, acetylenic diol or derivatized acetylenic diol based, alkane diol and derivatized of alkane diols, and silicone based defoamers. The amount of such compound can range from about 0 wt % to about 99 wt %.

One aspect of the invention relates to a PES containing composition comprising PES of this invention and, optionally, one or more surface active agents. The use of surface active agents means that the surface active agent function includes surfactants, detergents, emulsifiers, or compatibilizers. The surface active agents includes anionic, cationic, nonionic or zwitterionic. Examples of suitable anionic surface active agents include sodium and potassium salts of straight-chain fatty acids, sodium and potassium salts of coconut oil fatty acids, sodium and potassium salts of tall oil acids, amine salts of straight-chain fatty acids, amine salts of coconut oil fatty acids, amine salts of tall oil acids, N-Lauroyl sacroside, acylated polypepetides, alkylbenzenesulfonates, benzene sulfonate, toluene sulfonate, xylene sulfonate, cumenesulfonate, ligninsulfonates, petroleum sulfonates, N-acyl-n-alkyltaurates, paraffin sulfonates, secondary n-alkane-sulfonates, α-olefin sulfonates, sulfosuccinate esters, alkylnaphthalenesulfonates, isethionates, sulfated linear primary alcohols, sulfated polyoxyethyleneated straight-chain alcohols, sulfated triglyceride oils, phosphoric acid esters, polyphosphoric acid esters, phosphate polyoxyethylenated alcohols, sodium alkyl phosphates, perfluorocarboxylic acids, perfluoroalkyl sulfonates. Examples of suitable cationic surface active agents include long-chain amines and their salts, primary amines derived from animal and vegetable fatty acids and tall oil; synthetic $C_{12}$-$C_{18}$ primary, secondary or tertiary amines, diamine and polyamines and their salts, tetraalkylammonium salts of the type, $R_2N^+(CH_3)_2Cl^-$, and imidazolium salts. N-benzyl-N-alkyldimethylammonium halides, polyoxyethylenated (POE) long-chain amines, quaternized polyoxyethylenated (POE) long-chain amines, N-alkyldimethylamine oxides. Examples of suitable nonionic surface active agnets include polyoxyethylenated nonylphenol, polyoxyethylenated octylphenol, polyoxyethylenated dodecylphenol, polyoxyethylenated dinonylphenol, polyoxyethylenated linear alcohol, polyoxyethylenated secondary alcohol, polyoxyethylenated polyoxypropylene glycols, polyoxyethylenated mercaptans, long-chain carboxylic acid esters, glyceryl and polyglyceryl esters of natural fatty acids, propylene glycol, sorbital, and polyoxyethyleneated sorbital esters, polyoxyethylene glycol esters and polyoxyethyleneated fatty acids, polyoxyethylenated tall oil fatty acids, alkanolamine-fatty acid condensates, diethanolamides, tertiary acetylenic glycols, N-alkylpyrrolidones, alkylpolyglycosides, and acetylenic superwetters, such as alkoxylated acetylenic glycols, and organic superwetters, such as hydroxythioethers. Examples of suitable zwitterionic surface active agnets include β-N-alkylaminopropionic acids, β-N-alkyliminopropionic acids, imidazoline carboxylates, N-alkylbetaines, amine oxides, sulfobetaines and sultaines. The amount of such compound can range from about 0 wt % to about 99 wt %.

One aspect of the invention relates to a PES containing composition comprising PES of this invention and, optionally, one or more biocides. Examples of biocides include synthetic biocides, natural biocide derived from *brassica oleracea, brassica oleracea gemmifera*, and *clostridium botulinum* bacteria, pesticide, fungicides, herbicides, insecticides, algicides, molluscicides, miticides, rodenticides, antimicrobial, germicides, antibiotics, antibacterials, antivirals, antifungals, antiprotozoals and antiparasites, triclosan, cyclopentyl chloride, methyl cyanoacetate, potassium dimethyldithoicarbamate, dibromonitrilopropionamide, hydantoin, 3-iodo-2-propynyl butyl carbamate, sodium hydroxymethylglycinate, bicyclic oxazolidine, benzisothiazolinone, trichloro isocyanuric acid, diazolidinyl urea and paraben, methyl paraben, ethylparaben, propylparaben, peroxyacetic acid, 2,-2-dibromo-3-nitrilopropionamide, DMDM hydantoin, hexahydrotriazine, alkyl dimethyl benzyl ammonium chloride, di-iodomethyl-p-tolylsulfone, 1,2-pentadiol, phenoxy ethanol, undecylenic acid, 1,1,3,3-tetramethoxy propane, dehydroacetic acid, diazolidinyl urea and parabens, diazolidinyl urea, imidazolidinyl urea, sodium dehydroacetate, silica hydrogel, anisic acid, isothiazolinone, lithium salt of benzisothiazolinone, sodium hydroxymethylglycinate. The amount of such compound can range from about 0 wt % to about 50 wt.

One aspect of the invention relates to a PES containing composition comprising PES of this invention and, optionally, one or more dispersants. Examples of suitable dispersants include ricinolenic acid, acrylic acid maleic acid copolymer, acrylic copolymer, acrylic terpolymer, acrylic/sulfonate copolymer, sodium salt of polymeric carboxylic acid, sulfated castor oil, polyacrylic acid, sodium dicyclohexyl sulfosuccinate, sodium polyacrylate, disodium isopropylnaphthalene sulfonate, dioctyl ester of sodium sulfosuccinic acid, alkanolamide, potassium cetyl phosphate, cetyl phosphate, octyldodecyl myristate, sorbitan isostearate, isocetyl stearoyl stearate, glyceryl mono/dioleate, caprylic/Capri triglyceride, isostearyl neopentanoate, PEG-20 almond glycerides, alkoxylated linear alcohol, diglyceryl diisostearate, decyl oleate, hydroxyl-ethylidene diphosphonic acid, sulfonated kraft lignin, ethoxylated phenoxy condensate, cetyl ricinoleate benzoate, acetamide MEA, PEG-6 caprylic/capric glycerides, polymeric carboxylic acid salt, PEG-15 ditallate, PEG-8 stearate, PEG-20 stearate, glycerol monooleate. The amount of dispersants can range from about 0 wt % to about 99 wt %.

One aspect of the invention relates to a PES containing composition comprising PES of this invention and, optionally, one or more solubilizers. Examples of suitable solubilizers include phenethyl benzoate, alcohol phosphate, isotridecyl isononanoate, diethylhexyl adipate, branched chain ester blend, ethylhexyl hydroxystearate, propoxylated cetyl alcohol, arachidyl propionate ester, polysorbate 20, polysorbate 40, polysorbate 60, polysorbate 80, polysorbate 85, PEG-7 glyceryl cocoate, PPG-3 myristyl ether, ethylene oxide derivatives of castor oil, oleyl oleate, neopentyl glycol dicapate, isodecyl oleate, diisopropyl sebacate, diisopryl adipate, PEG-5 ceteth-20, polyethylene glycols, polypropylene glycols, amide-ether sulfate, propylene glycol dicaprylate/dicaprate, capramide DEA, cocamide DEA, PEG-4 stearate, PEG-4 dilaurate, PEG-4 laurate, PEG-8 dilaurate, PEG-8 dioleate, PEG-8 distearate, PEG-8 laurate, PEG-15 ditallate, PEG-12 tallate, PEG-8 stearate, PEG-20 stearate, PEG-40 stearate, PEG-100 stearate, sorbitan laurate, sorbitan palmate, sorbitan stearate, Oleth-2, Oleth-3, Oleth-5, Oleth-10, Oleth-20, steary alcohol, steareth-2, steareth-10, steareth-20, steareth-21, POE (12) lauryl ether, PEG-40 hydrogenated castor oil, alkyl benzoate, PEG-10 olive glycerides, caprylic/capric triglyceride, octyl decanol, 2-octyl-1-dodecanol, 2-butyl-1-octanol, blends of emollient esters, poloxamer 105 benzoate, dimethicone copolyol benzoate, methyl gluceth-20 benzoate, polyol fatty acid, castor oil, ricinolenic acid, cetyl dimethicone, polyoxyethylene (20) stearyl ether, propylene glycol dicaprate, and castor oil PEG-35. The amount of solubilizers can range from about 0 wt % to about 50 wt.

One aspect of the invention relates to a PES containing composition comprising PES of this invention and, optionally, one or more thickeners. Examples of suitable thickeners include acrylates copolymer, acrylates vinyl neodecanoate crosspolymer, PEG-150/decyl alcohol/SMDI copolymer, acrylates/steareth-20 methyacrylate copolymer, acrylates/C10-30 alkyl acrylate copolymer, sodium polyacryaltes, hydrogenated castor oil, cocamide DEA, poly(2-ethyl-2-oxazoline), laureth-2,1-amino dodecane, anionic associative acrylic copolymer, non-associated anionic acrylic copolymer, oleic diethanolamide, lauric/myristic diethanolamide, fumed silica, coconut diethanolamide, clay, organically modified montmorillonite clay, microcrystalline cellulose, lauryl diethylamine oxide, methyl cellulose, hydroxypropyl methyl cellulose, bentonite, natural hectorite clay, hexaglycerol dioleate, glyceryl tricaprate, crosslinked polyacrylic acid polymer, carbomer, cellulose gum, CMC, hydroxyethyl cellulose, polyanioinc cellulose, PEG-20 stearate, Stearamide MEA stearate, cetyl alcohol, glyceryl stearate, ethoxylated mixed alcohols, hydroxylpropyl guar, polyquaternium-32 (and) mineral oil (and) PPG-1 trideceth-6. The amount of thickeners can range from about 0 wt % to about 30 wt.

One aspect of the invention relates to a PES containing composition comprising PES of this invention and, optionally, one or more particles that are insoluble in the PES. While any suitable particle can be employed. Example of suitable particles include hydrophobically treated precipitated silicas, hydrophobically treated fumed silicas, waxes, ethylene bis-stearamide, titanium dioxide, The amount of such particles can range from about 0 wt % to about 30 wt %.

In another aspect of the invention, the PES containing composition comprises at least one diluent. Examples of suitable diluents comprise at least one of water, alcohols, ethers, glycols, polyakyleneglycol monobutyl ethers, mixture of n-paraffins, polyethylene glycols, methylether ketone, n-butanol, polyglycol isostearate, dipropylene glycol dimethyl ether, dipropylene glycol monomethyl ether, cetearyl isononanoate, isopropyl myristate, isopropyl palmitate, C12-C15 alkyl benzoate, 2,2,4 trimethyl-1,3-pentanediol diisobutyrate, ethylene glycol monostearate, ethylene glycol distearate, ethylene glycol monooleate, ethylene glycol dioleate, ethylene glycol monotallate, ethylene glycol ditallate, propylene glycol monooleate, propylene glycol monostearate, propylene glycol monotallate, propylene glycol dioleate, propylene glycol dstearate, propylene glycol ditallate, polypropylene glycol diester, polypropylene glycol dioleate, polypropylene glycol ditallate, polypropylene glycol monoleate, polypropylene glycol monotallate, polyethylene glycol diester, polyethylene glycol dioleate, polyethylene glycol ditallate, polyethylene glycol monoleate, polyethylene glycol monotallate, diethylene glycol monomethyl ether, diethylene glycol monoethyl ether, trimethylol propane oleate, neopentyl glycol oleate, pentaerythritol tetra oleate, pentaerythritol tetra stearate methyl oleate, methyl laurate, butyl oleate, butyl stearate, butyl laurate, ethyoxydiglycol, polygylcols, polypropylene glycol butyl ether, di-isopropyl ether, sec-butyl alcohol, diethyl ether, ethyl-amyl ketone, acetone, n-propanol, methyl-iso-butyl ketone, ethylene glycol butyl ether, isopropyl alcohol, butyl diglycol ether acetate, butyl glycol ether acetate, butyl triglycol ether, butyl diglycol ether, butyl glycol ether, diethyl ether, ethanol. The amount of such diluents can range from about 0 wt % to about 99 wt. %. A further aspect of the invention relates to a coating composition comprising the inventive PES or a PES containing composition. The coating composition can comprise at least one member selected from the group consisting of acrylic coatings, an acrylic binder, a styrene acrylate binder, a modified acrylate binder, a two-component polyurethane or onecomponent polyurethane binder system, a two-component epoxy binder system, a polyester binder, a hybrid acrylate polyurethane binder, a vinyl ester of versatic acid binder, a polyvinyl alcohol binder, a vinyl acetate ethylene binder, and an alkyd based binder. The amount of the inventive PES or PES containing composition can range from about 0.01 wt % to about 20 wt % of the coating composition.

The inventive PES can be combined with other compounds in order to obtain a PES containing composition. The PES or PES containing composition can be combined with a coating formulation in order to defoam or deaerate the composition. These combinations can be achieved by using conventional equipment and blending methods.

The coating compositions comprising the inventive PES or PES containing compositions can be applied onto a wide range of substrates. Examples of such substrates comprise at least one of wood, paper, plastic, metal, steel, concrete, composite, hybrid material, fiber and rubber, including substrates have been previously coated with polymeric or any other materials.

Coating compositions comprising the inventive PES or PES containing compositions can be applied by any suitable method. In particular, coating compositions can be applied by conventional airless or air assisted spraying methods known in the art. The inventive PES functions to defoam/deaerate the coating composition thereby enhancing the appearance or quality of the finish obtained from the coating. Without wishing to be bound by any theory or explanation, it is believed that the inventive PES enhances the compatibility of the components in the coating composition and, in turn, reduces the number of defects or craters in the finish.

Certain aspects of the invention are illustrated by the following Examples. The Examples do not limit the scope of the appended claims.

EXAMPLES

Examples 1 and 2 illustrate Equilibration of the silicone backbone $M^H D_x M^H$ where X=3-50. In certain aspects of the invention decamethylcyclopentasiloxane can be used instead of octamethylcyclotetrasiloxane. The acid catalyst used can be chosen from acid clay, amberlyst, triflic acid or sulphuric acid. Decamethylcyclopentasiloxane, octamethylcyclotetrasiloxane and tetramethyldisiloxanes are commercially available.

Example 1

Charge 1000 grams of octamethylcyclotetrasiloxane and 120.6 grams of tetramethyldisiloxane, mix and add 1.12 grams of acid clay. Heat to 80° C. and mix for 8 to 12 hours until the viscosity is stable. Cool to room temperature and filter to clarity. This will make a $M^H D_{15} M^H$ silicone backbone.

Example 2

Charge 1000 grams of octamethylcyclotetrasiloxane and 36.2 grams of tetramethyldisiloxane, mix and add 1.04 grams of acid clay. Heat to 80° C. and mix for 8 to 12 hours until the viscosity is stable. Cool to room temperature and filter to clarity. This will make a $M^H D_{50} M^H$ silicone backbone.

Examples 3, 4 and 5 illustrate a method for polyether capping. In Examples 3 and 4 the polyether can be $CH_2=CH-CH_2-O-(CH2-CH2-O)_X-(CH2-CH(CH3)-O)_Y Z$ where X any Y can range from 0-60. This polyether can be capped with Z which can be hydrogen, methyl, acetyl or butyl groups.

Example 3

Charge 1000 grams of a polyether which has X=2 and Y=7 (AAEO2PO7) and 194.2 grams of acetic anhydride. Heat to 115-120° C. and hold for 8 to 12 hours. Apply vacuum and light nitrogen sparge and remove acetic acid formed as well as excess acetic anhydride until the acid value is less than 1. This will make AAEO2PO7-Acetyl Capped.

Example 4

Charge 1000 grams of a polyether which has X=2 and Y=7 (AAEO2PO7) and 411 grams of sodium methylate (25% sodium methoxide in methanol). Apply vaccuum and light nitrogen sparge and slowly heat to 60-100° C. to remove the methanol. When the methanol has been removed cool to room temperature and add 105 grams of 1-chlorobutane. Heat to 80° C. and hold at this temperature until the alkali value is less than 2. This will make AAEO2PO7-Butyl Capped.

Example 5

Charge 1000 grams of a polyether which has Y=15 (AAPO15) and 244.5 grams of sodium methylate (25% sodium methoxide in methanol). Apply vaccuum and light nitrogen sparge and slowly heat to 60-100° C. to remove the methanol. When the methanol has been removed cool to room temperature and add 105 grams of 1-chlorobutane. Heat to 80° C. and hold at this temperature until the alkali value is less than 2. This will make AAPO15-Butyl Capped.

Examples 6, 7 and 8 illustrate a hydrosilylation reaction that is performed with a silicone backbone such as $M^H D_x M^H$ and a polyether such as $CH_2=CH-CH_2-O-(CH2-CH2-O)_X-(CH2-CH(CH3)-O)_Y Z$. A suitable solvent is used which can be chosen from xylene, toluene, and isopropanol. A platinum catalyst such as chloroplatinic acid or Karstedts catalyst is used to initiate the reaction.

Example 6 (No-capping)

Charge 448 grams of Example 1, $M^H D_{15} M^H$ silicone backbone, 513 grams of AAEO2PO7 and 200 grams of isopropanol. Heat to 80° C. and add 0.1 grams of Karstedts catalyst. React for 8 hours while monitoring the disappearance of the SiH peak by Infrared Spectroscopy. Remove the isopropanol by applying vacuum and a light nitrogen sparge.

Example 7 (butyl-cap)

Charge 448 grams of Example 1, $M^H D_{15} M^H$ silicone backbone, 558 grams of Example 4, AAEO2PO7-Butyl Capped and 200 grams of isopropanol. Heat to 80° C. and add 0.1 grams of Karstedts catalyst. React for 8 hours while monitoring the disappearance of the SiH peak by Infrared Spectroscopy. Remove the isopropanol by applying vacuum and a light nitrogen sparge.

Example 8 (acetyl-cap)

Charge 448 grams of Example 1, $M^H D_{15} M^H$ silicone backbone, 552 grams of Example 3, AAEO2PO7-Acetyl Capped and 200 grams of isopropanol. Heat to 80° C. and add 0.1 grams of Karstedts catalyst. React for 8 hours while monitoring the disappearance of the SiH peak by Infrared Spectroscopy. Remove the isopropanol by applying vacuum and a light nitrogen sparge.

Example 9

Charge 566 grams of $M^H D_{50} M^H$ silicone backbone, 434 grams of Example 5, AAPO15-Butyl Capped and 200 grams of xylene. Heat to 80° C. and add 0.04 grams of chloroplatinic acid catalyst dissolved in 2 grams of xylene. React for 8 hours while monitoring the disappearance of the SiH peak by Infrared Spectroscopy. Remove the xylene at 80-120° C. by applying vacuum and a light nitrogen sparge.

Example 10

This Example illustrates the performance of the inventive PES when employed in a coating composition that is used in an air assisted airless spray coating.

The formulation used for this work is a waterbased acrylate clearcoat for wood for furniture application. The composition of this coating is described in the table below.

| Raw Materials | Amount (gram) |
| --- | --- |
| Self cross-linking acrylic emulsion | 72.80 |
| Demi-water | 5.30 |
| Acetylenic Superwetter | 0.40 |
| Dipropylene Glycol Methyl Ether | 3.20 |
| Ethyldiglycol | 3.20 |
| Isopropanol (IPA) | 1.60 |

-continued

| Raw Materials | Amount (gram) |
|---|---|
| Demi-water | 1.80 |
| Rheology modifier | 4.20 |
| Organic Superwetter | 0.10 |
| Demi-water | 5.10 |
| De-aerator | 1.00 |
| Rheology modifier | 1.30 |
| Adjust pH to 8 | |
| TOTAL | 100.00 |

Preparation of the Samples:

The viscosity of the formulation was adjusted to 60 seconds with a DIN cup 4.

The experimental de-aerators have been post added to the clear coat at 1 wt % as delivered, mixed 20 min at 500 rpm. This mixture is left overnight before testing the next day.

Applications of the Samples:

The samples are air assisted airless spray applied using a spray gun from Wagner—AirCoat® gun model AC 4600 Professional—onto Leneta, followed by a 5 min flash off time at room temperature and then 20 min dried in the oven at 60° C. The wet film thickness is about 100 g/m².

Evaluation of the Panels:

The sprayed panels are then observed for foam control using a microscope.

The amount of foam bubbles present at the coating surfaces was quantified using image analysis software. The foam percentage (% foam in the table below) is calculated as the cumulative area taken up by the air bubbles as a fraction of the total selected area.

The lower the foam percentage the better the foam control.

The panels were also evaluated in order to assess the compatibility of the de-aerators. For that the amount of craters were counted per panels (panels area=22 cm*29 cm) and a ranking from 1 to 10 was given. The rating of "1" indicates poor appearance with lots of craters; the rating of "10" for the best appearance without any crater at all.

The results of the evaluation are presented in the table below:

| Compositions | Foam percentage (%) | Compatibility (1 = poor, 10 = best, no crater) |
|---|---|---|
| Blank (no deaerator) | 20.3 | 10 |
| 1% Surfynol (R) DF110C (molecular defoamer)* | 18.5 | 10 |
| 1% Surfynol (R) MD20 (molecular defoamer)* | 1.8 | 10 |
| 1% traditional Polysiloxane (Byk(R)018)** | 7.3 | 1 |
| 1% Example 6 (no capping) | 11.2 | 10 |
| 1% Example 7 (butyl capped) | 4.4 | 10 |
| 1% Example 8 (actetate capped) | 0.2 | 10 |

*Molecular defoamer from Air Products & Chemicals
**BYK-018 is a mixture of hydrophobic solids and foam destroying polysiloxanes, it is available from BYK USA Inc.

While the invention has been described with reference to certain aspects, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. It is important to note that the aspects disclosed herein can be alone and in combination with each other. Therefore, it is intended that the invention not be limited to the particular embodiment disclosed as the best mode contemplated for carrying out this invention, but that the invention will include all individual and combination of aspects falling within the scope of the appended claims.

The invention claimed is:

1. A composition comprising linear polyether modified silicone copolymers, wherein the copolymers are of formula:

M'D$_m$M' wherein M'=[(CH$_3$)$_2$(G)SiO$_{0.5}$—]; D=[—(CH$_3$)$_2$SiO—] and G=—(CH$_2$)$_n$—O—(CH$_2$—CH$_2$—O)$_x$—(CH$_2$—CH(CH$_3$)—O)$_y$Z; wherein m=3-50, n=1-6, X=0-20, Y=2-50 and Z is hydrogen, methyl, butyl, or acetyl group, and further comprising at least one member selected from the group consisting of acetylenic diols, derivatized acetylenic diols, alkane diols, derivatized alkane diols, and silicone based defoamers.

2. The composition of claim 1 wherein Z is an acetyl group.

3. A coating comprising the composition of claim 2.

4. The coating composition of claim 3 wherein the coating comprises at least an acrylic binder, a styrene acrylate binder, a silicone acrylate binder, a two-component polyurethane or one-component polyurethane binder system, a two-component epoxy binder system, a polyester binder, a vinyl ester of versatic acid binder, a polyvinyl alcohol binder, a vinyl acetate ethylene binder, and an alkyd based binder.

5. The composition of claim 1 wherein the composition is substantially free of graft type polyether modified silicone.

6. The composition of claim 1 wherein the polyether modified silicone copolymers are made by a method comprising contacting at least one silicone backbone with a capped polyether under hydrosilylation conditions while in the presence of at least one solvent and at least one catalyst.

7. The composition of claim 6 wherein the capped polyether comprises CH$_2$=CH—CH$_2$—O—(CH2-CH2-O)$_x$—(CH2-CH(CH3)-O)$_y$Z.

8. The composition of claim 6 wherein the solvent comprises at least one member selected from the group consisting of xylene, toluene, and isopropanol.

9. The composition of claim 6 wherein the catalyst comprises at least one of platinum catalyst and Karstedts catalyst.

10. The composition of claim 1 wherein Z is a butyl group.

11. The composition of claim 1 further comprising at least one surface active agent.

12. The composition of claim 1 further comprising at least one solubilizer.

13. The composition of claim 12 wherein the solubilizer comprises at least one member selected from the group consisting of phenethyl benzoate, alcohol phosphate, isotridecyl isononanoate, diethylhexyl adipate, branched chain ester blend, ethylhexyl hydroxystearate, propoxylated cetyl alcohol, arachidyl propionate ester, polysorbate 20, polysorbate 40, polysorbate 60, polysorbate 80, polysorbate 85, PEG-7 glyceryl cocoate, PPG-3 myristyl ether, ethylene oxide derivatives of castor oil, oleyl oleate, neopentyl glycol dicapate, isodecyl oleate, diisopropyl sebacate, diisopryl adipate, PEG-5 ceteth-20, polyethylene glycols, polypropylene glycols, amide-ether sulfate, propylene glycol dicaprylate/dicaprate, capramide DEA, cocamide DEA, PEG-4 stearate, PEG-4 dilaurate, PEG-4 laurate, PEG-8 dilaurate, PEG-8 dioleate, PEG-8 distearate, PEG-8 laurate, PEG-15 ditallate, PEG-12 tallate, PEG-8 stearate, PEG-20 stearate, PEG-40 stearate, PEG-100 stearate, sorbitan laurate, sorbitan palmate, sorbitan stearate, Oleth-2, Oleth-3, Oleth-5, Oleth-10, Oleth-20, steary alcohol, steareth-2, steareth-10, steareth-20, steareth-21, POE (12) lauryl ether, PEG-40 hydrogenated castor oil, alkyl benzoate, PEG-10 olive glycerides, caprylic/capric triglyceride, octyl decanol, 2-octyl-1-dodecanol, 2-butyl-1-octanol, blends of emollient esters, poloxamer 105 benzoate, dimethicone copolyol benzoate, methyl gluceth-20 benzoate, polyol fatty acid, castor oil, ricinolenic acid, cetyl dimethicone, polyoxyethylene (20) stearyl ether, propylene glycol dicaprate, and castor oil PEG-35.

14. A de-aerator composition comprising:
   at least one linear polyether modified silicone copolymer, wherein the copolymer is of formula:

$M'D_mM'$ wherein $M'=[(CH_3)_2(G)SiO_{0.5}—]$; $D=[—(CH_3)_2SiO—]$ and $G=—(CH_2)_n—O—(CH_2—CH_2—O)_x—(CH_2—CH(CH_3)—O)_yZ$; wherein m=3-50, n=1-6, X=0-20, Y=2-50 and Z is butyl, or acetyl group; and;
   at least one member selected from the group consisting of alcohols, glycols, esters and ethers.

15. The composition of claim 14 further comprising at least one defoamer.

16. The composition of claim 15 wherein the defoamer comprises at least one member selected from the group consisting of acetylenic diols, derivatized acetylenic diols, alkane diols, derivatized alkane diols, and silicone based defoamers.

17. The composition of claim 14 further comprising at least one dispersant.

18. The composition of claim 17 wherein the dispersant comprises at least one member selected from the group consisting of ricinolenic acid, acrylic acid maleic acid copolymer, acrylic copolymer, acrylic terpolymer, acrylic/sulfonate copolymer, sodium salt of polymeric carboxylic acid, sulfated castor oil, polyacrylic acid, sodium dicyclohexyl sulfosuccinate, sodium polyacrylate, disodium isopropylnaphthalene sulfonate, dioctyl ester of sodium sulfosuccinic acid, alkanolamide, potassium cetyl phosphate, cetyl phosphate, octyldodecyl myristate, sorbitan isostearate, isocetyl stearoyl stearate, glyceryl mono/dioleate, caprylic/Capri triglyceride, isostearyl neopentanoate, PEG-20 almond glycerides, alkoxylated linear alcohol, diglyceryl diisostearate, decyl oleate, hydroxyl-ethylidene diphosphonic acid, sulfonated kraft lignin, ethoxylated phenoxy condensate, cetyl ricinoleate benzoate, acetamide MEA, PEG-6 caprylic/capric glycerides, polymeric carboxylic acid salt. PEG-15 ditallate, PEG-8 stearate, PEG-20 stearate, and glycerol monooleate.

19. A de-aerator composition comprising:
   at least one linear polyether modified silicone copolymer, wherein the copolymer is of formula:

$M'D_mM'$ wherein $M'=[(CH_3)_2(G)SiO_{0.5}—]$; $D=[—(CH_3)_2SiO—]$ and $G=—(CH_2)_n—O—(CH_2—CH_2—O)_x—(CH_2—CH(CH_3)—O)_yZ$; wherein m=3-50, n=1-6, X=0-20, Y=2-50 and Z is butyl, or acetyl group;
   dipropylene glycol methyl ether,
   polypropylene glycol diester and,
   isopropanol.

20. A composition comprising linear polyether modified silicone copolymers, wherein the copolymers are of formula:

$M'D_mM'$ wherein $M'=[(CH_3)_2(G)SiO_{0.5}—]$; $D=[—(CH_3)_2SiO—]$ and $G=—(CH_2)_n—O—(CH_2—CH_2—O)_x—(CH_2—CH(CH_3)—O)_yZ$; wherein m=3-50, n=1-6, X=0-20, Y=2-50 and Z is hydrogen, methyl, butyl, or acetyl group, and at least one member selected from the group consisting of ricinolenic acid, acrylic acid maleic acid copolymer, acrylic copolymer, acrylic terpolymer, acrylic/sulfonate copolymer, sodium salt of polymeric carboxylic acid, sulfated castor oil, polyacrylic acid, sodium dicyclohexyl sulfosuccinate, sodium polyacrylate, disodium isopropylnaphthalene sulfonate, dioctyl ester of sodium sulfosuccinic acid, alkanolamide, potassium cetyl phosphate, cetyl phosphate, octyldodecyl myristate, sorbitan isostearate, isocetyl stearoyl stearate, glyceryl mono/dioleate, caprylic/Capri triglyceride, isostearyl neopentanoate, PEG-20 almond glycerides, alkoxylated linear alcohol, diglyceryl diisostearate, decyl oleate, hydroxyl-ethylidene diphosphonic acid, sulfonated kraft lignin, ethoxylated phenoxy condensate, cetyl ricinoleate benzoate, acetamide MEA, PEG-6 caprylic/capric glycerides, polymeric carboxylic acid salt, PEG-15 ditallate, PEG-8 stearate, PEG-20 stearate, and glycerol monooleate.

* * * * *